(12) United States Patent
Mohrschladt

(10) Patent No.: US 6,359,020 B1
(45) Date of Patent: *Mar. 19, 2002

(54) METHOD FOR PRODUCING POLYAMIDES FROM AMINONITRILES

(75) Inventor: Ralf Mohrschladt, Schwetzingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,070

(22) PCT Filed: Feb. 2, 1999

(86) PCT No.: PCT/EP99/00653

§ 371 Date: Jul. 11, 2000

§ 102(e) Date: Jul. 11, 2000

(87) PCT Pub. No.: WO99/38907

PCT Pub. Date: Aug. 5, 1999

(30) Foreign Application Priority Data

Feb. 2, 1998 (DE) .......................................... 198 04 020

(51) Int. Cl.$^7$ ................................................. C08J 11/04
(52) U.S. Cl. ...................................... 521/49.8; 528/310
(58) Field of Search .......................... 521/49.8; 528/310

(56) References Cited

U.S. PATENT DOCUMENTS

| | | | |
|---|---|---|---|
| 4,053,457 A | 10/1977 | Cordes et al. | |
| 5,646,191 A | 7/1997 | Wiltzer et al. | |
| 5,902,553 A | 5/1999 | Wiltzer et al. | |
| 6,069,228 A | * 5/2000 | Alsop | 528/310 |
| 6,194,538 B1 | * 2/2001 | Weiss | 528/310 |
| 6,201,096 B1 | * 3/2001 | Marchildon | 528/310 |

FOREIGN PATENT DOCUMENTS

WO 99/38907 8/1999

* cited by examiner

*Primary Examiner*—Paul R. Michl
(74) *Attorney, Agent, or Firm*—Keil & Weinkaup

(57) ABSTRACT

Aqueous monomer and oligomer extracts obtained from polyamide production by extraction of the polymer with water are used for producing polyamides by direct reaction with aminonitriles.

10 Claims, No Drawings

METHOD FOR PRODUCING POLYAMIDES FROM AMINONITRILES

The present invention relates to a process for producing polyamides from aminonitriles and aqueous media at elevated temperature and elevated pressure.

This invention further relates to the use of aqueous monomer and oligomer extracts obtained from polyamide production by extraction of the polymer with water.

The polymers formed in polyamide production by polymerization of, for example, ε-caprolactam contain low molecular weight fractions composed of caprolactam and oligomers thereof. In practice, these low molecular weight fractions are removed by extraction with hot water. The caprolactam can be recovered from these extraction waters (aqueous monomer and oligomer extracts), purified and, if desired, reintroduced into the polymerization. It is also possible to add lyzing reagents to convert the oligomers in the extract waters into caprolactam which may likewise be isolated, purified and reused.

DE-A-25 01 348 describes a process for producing polyamides from ε-caprolactam including a step of extracting with a solvent after the polymerization. The extract, containing monomers and oligomers, is concentrated in the absence of atmospheric oxygen in an apparatus in which the extract-contacting surfaces are constructed in materials which are inert under the conditions of the concentrating step. The concentrate obtained is polymerized without further purification or fractionation, alone or together with other polyamide-forming starting materials.

U.S. Pat. No. 3,459,640 describes a process for recovering purified caprolactam from polycaproamide extraction solutions. The crude caprolactam is passed through a heat exchanger and then into a separator where purified caprolactam is distilled off under reduced pressure. The caprolactam can be returned into the reaction.

U.S. Pat. No. 5,077,381 describes a process for producing polyamides from amide monomers wherein unconverted amide monomers and oligomers are extracted, the relative proportion of oligomers in the extract is reduced by heat treatment at 220 to 290° C., and the extracted portion of the reaction mixture is returned into the reaction.

In EP-A-0 608 454, polyamide-6 wastes or oligomer-containing polyamide-6 wastes or oligomeric lactam residues are recovered by subjecting them to a depolymerizing hydrolysis in a pressure reactor in the presence of added water.

All the processes mentioned have the disadvantage that the extract water has to undergo a workup, in multiple stages in some instances, before the entire extract or constituents thereof, especially caprolactam, can be used for renewed polymerization. The processes which envisage removal, workup and recycling of caprolactam have the additional disadvantage that the oligomers in the extract waters are not worked up, but have to be disposed of. Furthermore, the aforementioned processes for recycling extract water assume the use of a process step for hydrolytic polymerization of the extract water concentrate or of a mixture of extract water constituents and caprolactam.

It is an object of the present invention to provide a process for recycling extract water, i.e. aqueous monomer and oligomer extracts obtained from polyamide production by extraction of the polymer with water, by using the aqueous extract solutions in the polymerization ideally directly without prior workup, concentrating or removal steps. The process shall moreover avoid the disadvantages of existing processes.

We have found that this object is achieved according to the invention by the use of aqueous monomer and oligomer extracts obtained from polyamide production by extraction of the polymer with water for producing polyamides by direct reaction with aminonitriles.

The invention also provides a process for producing polyamides by reacting at least one aminonitrile with aqueous monomer and oligomer extracts obtained from polyamide production by extraction of the polymer with water.

According to the invention, the aqueous monomer and oligomer extracts are returned into the polymerization without further workup steps. Accordingly, no concentrating, fractionation or purification is necessary.

The inventive process for recycling the aqueous extracts can be carried out batchwise or continuously.

Preference is given to converting a reaction mixture comprising aqueous monomer and oligomer extracts, aminonitrile and water into polyamide in a multiphase production process. The composition of the reaction mixture depends on the extractables contents of the aqueous extract. According to the invention, the water content of the reaction mixture is within the range from 10 to 80% by weight, preferably within the range from 25 to 60% by weight.

Preference is given according to the invention to such a process for producing a polyamide by reaction of at least one aminonitrile with water as comprises:

(1) reacting at least one aminonitrile with an aqueous medium at a temperature from 90 to 400° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and separating the first gas phase from the first liquid or the first solid phase or from the mixture of first liquid and first solid phase, and (3) admixing the first liquid or the first solid phase or the mixture of first liquid and first solid phase with a gaseous or liquid phase comprising an aqueous medium at a temperature from 90 to 370° C. and a pressure from 0.1 to $30 \times 10^6$ Pa to obtain a product mixture, the aqueous medium used in step 1 and/or 3 being aqueous monomer and oligomer extracts obtained from polyamide production by extraction of the polymer with water, and otherwise water.

The process may comprise, additionally or instead of step 3, the following step:

(4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

Thus, the aqueous monomer and oligomer extracts can be returned into step 1, step 3 or into both steps of the process. If the aqueous extract is not used, water can be used instead.

The aminonitrile in the mixture can be in principle any aminonitrile, i.e., any compound having both at least one amino group and at least one nitrile group. ω-Aminonitriles are preferred, especially ω-aminoalkyl nitrites having from 4 to 12 carbon atoms, more preferably 4 to 9 carbon atoms, in the alkylene moiety, or an aminoalkylaryl nitrile having from 8 to 13 carbon atoms, preferred aminoalkylaryl nitrites being aminoalkylaryl nitriles which have an alkylene group of at least one carbon atom between the aromatic unit and the amino and nitrile group. Especially preferred aminoalkylaryl nitriles are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of aminonitriles or mixtures of an aminonitrile with further comonomers, such as caprolactam or the below-defined mixture.

In a particular embodiment, especially if copolyamides or branched or chain-lengthened polyamides are to be prepared, the following mixture is used instead of pure 6-aminocapronitrile:

from 50 to 99.9, preferably from 80 to 90, % by weight of 6-aminocapronitrile, from 0.01 to 50, preferably from 1 to 30, % by weight of at least one dicarboxylic acid selected from the group consisting of aliphatic $C_4$–$C_{10}$-α-ω-dicarboxylic acids, aromatic $C_8$–$C_{12}$-dicarboxylic acids and $C_5$–$C_8$-cycloalkanedicarboxylic acids, from 0 to 50, preferably from 0.1 to 30, % by weight of an α,ω-diamine having from 4 to 10 carbon atoms, from 0 to 50, preferably from 0 to 30, % by weight of an α,ω-$C_2$–$C_{12}$-dinitrile, and from 0 to 50, preferably from 0 to 30, % by weight of an α,ω-$C_5$–$C_{12}$-amino acid or of the corresponding lactam, from 0 to 10% by weight of at least one inorganic acid or salt thereof, the individual weight percentages adding up to 100%.

Suitable dicarboxylic acids include aliphatic $C_4$–$C_{10}$α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8$–$C_{12}$-dicarboxylic acids such as terephthalic acid and also $C_5$–$C_8$-cycloalkanedicarboxylic acids such as cyclohexanedicarboxylic acid.

Suitable α,ω-diamines having from 4 to 10 carbon atoms include tetramethylenediamine. pentamethylenediamine, hexamethylenediamine, heptarnethylenediamine, octamethylenediamine, nonamethylenediamine and decamethylenediamine, preferably hexamethylenediamine.

It is further also possible to use salts of the aforementioned dicarboxylic acids and diamines, especially the salt of adipic acid and hexamethylenediamine, which is known as 66 salt.

The α,ω-$C_2$–$C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired it is also possible to use diamines, dinitriles and aminonitriles derived from branched alkyls or aryls or alkylaryls.

The α,ω-$C_5$–$C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid. 11-aminoundecanoic acid or 12-aminododecanoic acid, preferably 6-aminohexanoic acid.

The reaction in the first step can be carried out without a catalyst or in the presence of a metal oxide catalyst. In what follows, the reaction conditions are described without catalyst and with catalyst (in brackets).

According to the invention, the first step (step 1) involves heating an aminonitrile with water at a temperature from about 100(90) to about 400(400)° C., preferably about 200(180) to about 350(310)° C., especially about 240(220) to about 290(270)° C., to which a pressure from about 0.1 to about 35(15)×$10^6$ Pa, preferably about 1(1) to about 15(10)×$10^6$ Pa, especially 4(4) to about 11(9)×$10^6$ Pa, is set. In this step, the pressure and the temperature can be adjusted relative to each other in such a way as to obtain a liquid or a solid phase and a mixture of liquid or solid phase and a gaseous phase. Preferably, the reaction mixture should be present as a single liquid phase.

According to the invention, water or extract is used in a molar ratio of aminoalkyl nitrile to water within the range from 1:1 to 1:30(1:10), particularly preferably within the range from 1:2 to 1:10(1:8), very particularly preferably within the range from 1:2 to 1:8(1:6), preference being given to the use of water or extract in excess, based on the aminoalkyl nitrile used.

In this embodiment, the liquid or solid phase or the mixture of liquid and solid phase corresponds to the reaction mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous. Of course, the pressure and temperature can also be adjusted relative to each other in such a way that the synthesis mixture is present as a single solid or liquid phase.

The removal of the gas phase can be effected by the use of stirred or unstirred separating vessels or vessel batteries and by the use of evaporator apparatus, for example by means of circulatory evaporators or thin-film evaporators, as by film extruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

Step 1 can be carried out using stirred vessels, flow pipes or vessel batteries. A two-phase procedure is preferably carried out using vessels or a reaction column, whereas a procedure involving a single liquid phase is preferably carried out using a packed flow pipe. The use of a tube bundle reactor, facultatively packed, in the first process step is likewise possible and advantageous for a two-phase procedure especially, to improve the heat transfer and to further reduce the axial back-mixing of the reactants.

Usable packing elements include, for example, Raschig rings or Sulzer mixing elements in order that a narrow residence time distribution may be ensured and in order that back-mixing may be limited.

In a further embodiment, the reactor of the first step is subjected to a downward flow regime, in which case it is again preferably equipped with packing elements which limit any axial back-mixing of the reactants. As a result, the ammonia gas liberated in the reactor, predominantly directly after entry into the reactor, reaches the gas phase at the top of the reactor by the most direct route. Interference caused to the flow profile in the further course of the reactor by ascending gas bubbles or convection is therefore minimal.

As regards the residence time of the synthesis mixture in the first step, there are no restrictions whatsoever; however, it is generally set within the range from about 10 minutes to about 10 hours, preferably within the range from about 30 minutes to about 6 hours.

Although there are no restrictions whatsoever concerning the degree of conversion of nitrile groups in step 1 either, economic reasons especially dictate that the conversion of nitrile groups in step 1 be generally not less than about 70 mol %, preferably at least about 95 mol %, and especially within the range from about 97 to about 99 mol %, based in each case on the moles of aminonitrile used.

The nitrile group conversion is customarily determined by means of IR spectroscopy (CN stretching vibration at 2247 wavenumbers), NMR or HPLC, preferably by IR spectroscopy. In a further preferred embodiment, the aminonitrile/water mixture is continuously heated with the aid of a heat exchanger and the mixture thus heated is introduced into a reaction vessel heated to the same temperature, preferably into a tube which, if desired, may include internals such as Sulzer mixing elements to avoid back-mixing. Of course, the aminonitrile and the water can also be heated up separately.

Nor does the invention rule out conducting the reaction in step 1 in the presence of oxygen-containing phosphorus compounds, especially phosphoric acid, phosphorous acid and hypophosphorous acid and their alkali metal and alkaline earth metal salts and ammonium salts such as $Na_3PO_4$, $NaH_2PO_4$, $Na_2HPO_4$, $NaH_2PO_3$, $Na_2HPO_3$, $NaH_2PO_2$, $K_3PO_4$, $KH_2PO_4$, $K_2HPO_4$, $KH_2PO_3$, $K_2HPO_3$, $KH_2PO_2$, in which case the molar ratio of ω-aminonitrile to phosphorus compounds is selected within the range from 0.01:1 to 1:1, preferably within the range from 0.01:1 to 0.1:1.

It is further advantageous to use known metal oxides, such as titanium dioxides, zirconium oxide, aluminum oxide, lanthanum oxide, magnesium oxide, etc., preferably a Bronsted acid catalyst selected from a beta zeolite catalyst, sheet-silicate catalyst or a titanium dioxide catalyst, for heterogeneous catalysis in the individual process steps in order that the conversion, especially of the nitrile groups, may be boosted. Preference is given to titanium dioxides, especially titanium dioxides comprising from 70 to 100% by weight of anatase and from 0 to 30% by weight of rutile in which up to 40% by weight of the titanium dioxide may be replaced by tungsten oxide. For pure starting materials (aminonitrile) preference is given to using a titanium dioxide having a high anatase content. Preferred titanium oxides are from 70 to 100% by weight anatase and from 0 to 30% by weight rutile. The catalyst preferably has a pore volume of from 0.1 to 5 ml/g, particularly preferably from 0.2 to 0.5 ml/g. The average pore diameter is preferably within the range from 0.005 to 0.1 μm, particularly preferably within the range from 0.01 to 0.06 μm. If highly viscous products are used, the average pore diameter should be large. The cutting hardness is preferably greater than 20 N, particularly preferably >25 N. The BET surface area is preferably more than 40 m²/g, particularly preferably more than 100 m²/g. If the BET surface area is smaller, the bed volume should be appropriately higher to ensure adequate catalyst activity. Particularly preferred catalysts have the following properties: 100% of anatase; 0.3 ml/g pore volume; 0.02 μm average pore diameter; 32 N cutting hardness; 116 m²/g BET surface area or 84% by weight of anatase; 16% by weight of rutile; 0.3 ml/g pore volume; 0.03 μm average pore diameter; 26 N cutting hardness; 46 m²/g BET surface area. The catalysts may be prepared from commercial powders as available for example from Degussa, Finti or Kemira. When tungsten oxide is used, up to 40% by weight, preferably up to 30% by weight, particularly preferably from 15 to 25% by weight of the titanium dioxide is replaced by tungsten oxide. The catalysts can be prepared as described in Ertl, Knözinger. Weitkamp: "Handbook of heterogeneous catalysis". VCH Weinheim, 1997, pages 98 ff. The metal oxides can be used in any desired suitable form. They are preferably used in the form of pellets, extrudates or shaped articles. Particular preference is given to pellets from 1 to 10 mm in diameter and from 1 to 50 mm in length. The pellets can be used alone or combined with metallic packings such as Raschig rings. The pellets and metallic shapes may be present as a mixture or as a sequence of layers of metal oxide and metallic shapes.

The abovementioned metal oxides are not used in step 4, but they can be used in steps 1 to 3, preferably 1 and 3, in which case the use in step 1 is particularly preferred.

According to the invention, the reaction mixture obtained in the first step is further reacted in step 2 at a temperature from about 150(200) to about 400(350)° C., preferably at a temperature within the range from about 200(210) to about 330(300)° C., especially within the range from about 230 (230) to about 290(270)° C. and a pressure which is lower than the pressure in step 1. The pressure in the second step is preferably at least about $0.5 \times 10^6$ Pa lower than the pressure in step 1, and generally the pressure will be within the range from about 0.1 to about $45 \times 10^6$ Pa, preferably within the range from about 0.5 to about $15 \times 10^6$ Pa, especially within the range from about 2 to about $6 \times 10^6$ Pa.

In step 2, the temperature and the pressure are chosen so as to obtain a first gas phase and a first liquid or first solid phase or a mixture of first liquid and first solid phase and the first gas phase is separated from the first liquid or first solid phase or from the mixture of first liquid and first solid phase.

The first gaseous phase, which consists essentially of ammonia and water vapor, is generally removed continuously by means of a distillation apparatus, such as a distillation column. Any organic constituents of the distillate coremoved in the course of this distillation, predominantly unconverted aminonitrile, can be wholly or partly recycled into step 1 and/or step 2.

The residence time of the reaction mixture in step 2 is not subject to any restrictions whatsoever, but is generally within the range from about 10 minutes to about 5 hours, preferably within the range from about 30 minutes to about 3 hours.

The product line between the first and second steps optionally contains packing elements, for example Raschig rings or Sulzer mixing elements, which facilitate a controlled expansion of the reaction mixture into the gas phase.

In step 3, the first liquid or the first solid phase or the mixture of first liquid and first solid phase is admixed with a gaseous or liquid phase comprising an aqueous medium, preferably with water or water vapor or extract. This is preferably done continuously. The amount of water or extract added (as liquid) is preferably within the range from about 50 to about 1500 ml, more preferably within the range from about 100 to about 500 ml, based on 1 kg of the first liquid or first solid phase or of the mixture of first liquid and first solid phase. This addition of water or extract primarily compensates the water losses incurred in step 2 and furthers the hydrolysis of acid amide groups in the synthesis mixture. This results in a further advantage of this invention, that the mixture of the starting materials as used in step 1 can be used with a small excess of water only.

In another embodiment of the invention, step 3 can be carried out using aqueous extracts having a higher extractables content of up to 85%. In this case, it is advantageous to adjust the pressure and temperature parameters of step 3 in such a way that the synthesis mixture is present as a single liquid phase to avoid the formation of organic and inorganic deposits or fouling on reactor walls and packing elements. If desired, the highly concentrated aqueous extract may have caprolactam added to it prior to introduction into step 3 to improve the solubility of caprolactam oligomers and to prevent the deposition of oligomers and thus the plugging of apparatus.

The gaseous or liquid phase comprising water or aqueous extracts is preferably preheated in a heat exchanger before being introduced into step 3 and then mixed with the first liquid or the first solid phase or the mixture of first solid and first liquid phase. The reactor may optionally be fitted with mixing elements which further the mixing of the components.

Step 3 can be operated at a temperature from 150 to 370° C. and a pressure from 0.1 to $30 \times 10^6$ Pa. If a catalyst bed is present, the conditions applying to step 1 may be employed.

The pressure and temperature can be adjusted to each other in such a way that the synthesis mixture is present as a single liquid or solid phase. In another embodiment, the pressure and temperature are selected so that a liquid or a solid phase or a mixture of solid and liquid phase and also a gaseous phase are obtained. In this embodiment, the liquid or solid phase or the mixture of liquid and solid phase corresponds to the product mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous.

The pressure can be adjusted at a preselected temperature so that the pressure is smaller than the equilibrium vapor pressure of ammonia but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this step can be identical with those of step 1, discussed above.

In a preferred embodiment, the two-phase procedure is carried out by subjecting the reactor of the first step to downward flow, in which case this reactor is preferably again equipped with catalyst and/or packing elements which limit any axial back-mixing of the reactants. As a result, the ammonia gas liberated in the reactor, predominantly directly after entry into the reactor, reaches the gas phase at the top of the reactor by the most direct route. Interference caused to the flow profile in the further course of the reactor by ascending gas bubbles or convection is therefore minimal.

The residence time of this step is likewise not subject to any restrictions, but economic reasons generally dictate a range from about 10 minutes to about 10 hours, preferably from about 1 to about 8 hours, particularly preferably from about 1 to 6 hours.

The product mixture obtained in step 3 can be further processed as described below.

In a preferred embodiment, the product mixture of step 3 is subjected to a postcondensation in a fourth step at temperatures from about 200 to about 350° C., preferably at temperatures from about 220 to 300° C., especially from about 250 to 270° C. Step 4 is carried out at a pressure which is below the pressure of step 3 and is preferably within the range from about 5 to $1000 \times 10^3$ Pa, more preferably within the range from about 10 to about $300 \times 10^3$ Pa. In the context of this step, the temperature and pressure are selected so as to obtain a second gas phase and a second liquid or solid phase or a mixture of second liquid and second solid phase which each comprise the polyamide.

The postcondensation of step 4 is preferably carried out in such a way that the relative viscosity (measured at a temperature of 25° C. and a concentration of 1 g of polymer per 100 ml in 96% strength by weight of sulfuric acid) of the polyamide assumes a value within the range from about 1.6 to about 3.5.

In a preferred embodiment, any water present in the liquid phase can be expelled by means of an inert gas such as nitrogen.

The residence time of the reaction mixture in step 4 depends especially on the desired relative viscosity, the temperature, the pressure and the amount of water added in step 3.

If step 3 is operated as a single-phase regime, the product line between step 3 and step 4 may optionally contain packing elements, for example Raschig rings or Sulzer mixing elements, which allow a controlled expansion of the synthesis mixture in the gas phase.

In a further embodiment of the invention, step 3 may be dispensed with and the polyamide prepared by carrying out steps (1), (2) and (4).

This variant—without catalyst—is preferably carried out as follows:

In step 1, at least one aminoalkyl nitrile is heated with an excess of water and/or extract water at a temperature within the range from about 250 to about 350° C. and a pressure of from about 4 to $30 \times 10^6$ Pa, the pressure and temperature being adjusted to each other in such a way that the synthesis mixture is present as a single liquid phase and the nitrile group conversion being not less than 95 mol %, based on the moles of aminoalkyl nitrile used, to obtain a reaction mixture.

The reaction mixture is treated in step 2 at a temperature within the range from about 220 to about 300° C. and a pressure within the range from about 1 to about $7 \times 10^6$ Pa, the pressure in the second step being at least $0.5 \times 10^6$ Pa lower than in step 1. At the same time, the resulting first gas phase is separated from the first liquid phase.

The first liquid phase obtained in step 2 is treated in step 3 at a temperature within the range from about 220 to 30° C. and a pressure within the range from about 10 to about $300 \times 10^3$ Pa, the resulting second, water- and ammonia-comprising gas phase being separated from the second liquid phase. Within this step, the relative viscosity (measured as defined above) of the resulting polyamide is adjusted to a desired value within the range from about 1.6 to about 3.5 through choice of temperature and residence time.

The resulting second liquid phase is then conventionally discharged and, if desired, worked up.

If metal oxide catalysts are employed, the above-described low temperatures and pressures can be used.

The above-described processes, i.e., the sequence according to the invention of steps (1) to (3) or (1), (2) and (4) or (1) to (4), can be carried out batchwise, i.e., in succession in a single reactor, or continuously, i.e., simultaneously in successive reactors. It is also possible, of course, to carry out some of these steps, for example steps (1) and (2), continuously and the remaining step(s) batchwise.

In a further preferred embodiment of the present invention, at least one of the gas phases obtained in the respective steps can be recycled into at least one of the preceding steps.

It is further preferable to select the temperature and the pressure in step 1 or in step 3 or in both step 1 and step 3 so as to obtain a liquid or a solid phase or a mixture of liquid and solid phase and a gaseous phase and to separate off the gaseous phase.

Furthermore, in the context of the process of the invention, it is also possible to carry out a chain lengthening or branching or a combination thereof. For this purpose, polymer branching or chain-lengthening substances known to a person skilled in the art are added in the individual steps. These substances are preferably added in step 3 or 4.

Usable substances are:

Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

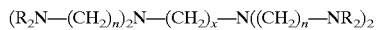 (I)

where

R is H or —(CH$_2$)$_n$—NR$^1$$_2$, where

R$^1$ is H or —(CH$_2$)$_n$—NR$^2$$_2$, where

R$^2$ is H or —(CH$_2$)$_n$—NR$^3$$_2$, where

R$^3$ is H or —(CH$_2$)$_n$—NH$_2$, n is an integer from 2 to 6, and x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a —(CH$_2$)$_n$—NH$_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanin, naphthalocyanin. Preference is given to 3,5,3',5'-biphenyltetracarboxylic acid-phthalocyanine, naphthalocyanine, 3,5,5',5'-biphenyltetracarboxylic acid, 1,3,5,7-naphthalenetetracarboxylic acid, 2,4,6-pyridinetricarboxylic acid. 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 $\mu$mol/g of polyamide, preferably from 1 to 35, particularly preferably 1 to 20, $\mu$mol/g of polyamide. The substances are preferably present in an amount from 3 to 150, particularly preferably from 5 to 100, especially from 10 to 70, $\mu$mol of equivalents/g of polyamide. The equivalents are based on the number of functional amino groups or carboxylic acid groups.

Difunctional carboxylic acids or difunctional amines are used as chain lengtheners. These have 2 carboxylic acid groups which can be reacted with amino groups, or 2 amino groups which can be reacted with carboxylic acids. The difunctional carboxylic acids or arnines, as well as the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimethylhexamethylenediamine, from Hüls AG). In addition, the diamines can also be aromatic-aliphatic, it being possible to use n-xylylenediamine for example. Entire amines can each be substituted by $C_{1-12}$-alkyl, preferably $C_{1-4}$-alkyl, radicals on the carbon skeleton.

Difunctional carboxylic acids are for example those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks (c) are preferably used in amounts from 1 to 55, particularly preferably from 1 to 30, especially from 1 to 15, $\mu$m/g of polyamide.

According to the invention, the product mixture obtained in step 3, or the second liquid or second solid phase or the mixture of second liquid and second solid phase (from step 4) which each comprise the polyamide, preferably a polymer melt, is discharged from the reaction vessel in a conventional manner, for example by means of a pump. Subsequently, the polyamide obtained can be worked up according to conventional methods, as described for example in DE-A 43 21 683 (page 3 line 54 to page 4 line 3) at length.

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A-0 284 968, for example). The low molecular weight constituents obtained in this aftertreatment, such as caprolactam, linear caprolactam oligomer and cyclic caprolactam oligomer, can be recycled into the first and/or second and/or third step.

The starting mixture and the synthesis mixture can be admixed in all steps with chain regulators such as aliphatic and aromatic carboxylic and dicarboxylic acids and catalysts such as oxygen-containing phosphorus compounds in amounts within the range from 0.01 to 5% by weight, preferably within the range from 0.2 to 3% by weight, based on the amount of polyamide-forming monomers and aminonitriles used. Suitable chain regulators include for example propionic acid, acetic acid, benzoic acid, terephthalic acid and triacetonediamine.

Additives and fillers such as pigments, dyes and stabilizers are generally added to the synthesis mixture prior to pelletization, preferably in the second, third and fourth step. Particular preference is given to using fillers and additives whenever the synthesis or polymer mixture will not encounter fixed bed catalysts in the rest of the processing. One or more impact-modified rubbers may be present in the compositions as additives in amounts from 0 to 40% by weight, preferably from 1 to 30% by weight, based on the entire composition.

It is possible to use, for example, customary impact modifiers which are suitable for polyamides and/or polyarylene ethers.

Rubbers which enhance the toughness of polyamides generally have two essential features: they have an elastomeric portion which has a glass transition temperature of less than −10° C., preferably less than −30° C., and they contain at least one functional group which is capable of interaction with the polyamide. Suitable functional groups include for example carboxylic acid, carboxylic anhydride, carboxylic ester, carboxylic amide, carboxylic imide, amino, hydroxyl, epoxide, urethane and oxazoline groups.

Examples of rubbers which enhance the toughness of the blends include for example:

EP and EPDM rubbers grafted with the above functional groups. Suitable grafting reagents include for example maleic anhydride, itaconic acid, acrylic acid, glycidyl acrylate and glycidyl methacrylate.

These monomers can be grafted onto the polymer in the melt or in solution, in the presence or absence of a free-radical initiator such as cumene hydroperoxide.

The copolymers of α-olefins described under the polymers A, including especially the ethylene copolymers, may also be used as rubbers instead of polymers A and be mixed as such into the compositions of the invention.

A further group of suitable elastomers are core-shell graft rubbers. These are graft rubbers which are produced in emulsion and which have at least one hard and one soft component. A hard component is customarily a polymer having a glass transition temperature of at least 25° C., while a soft component is a polymer having a glass transition temperature of not more than 0° C. These products have a structure made up of a core and at least one shell, the structure being the result of the order in which the monomers are added. The soft components are generally derived from butadiene, isoprene, alkyl acrylates, alkyl methacrylates or siloxanes and optionally further comonomers. Suitable siloxane cores can be prepared for example starting from cyclic oligomeric octamethyltetrasiloxane or tetravinyltetramethyltetrasiloxane. These can be for example reacted with γ-mercaptopropylmethyldimethylsiloxane in a ring-opening cationic polymerization, preferably in the presence of sulfonic acids, to form the soft siloxane cores. The siloxanes can also be crosslinked by, for example, conducting the polymerization reaction in the presence of silanes having hydrolyzable groups such as halogen or alkoxy groups such as tetraethoxysilane, methyltrimethoxysilane or phenyltrimethoxysilane. Suitable comonomers here include for example styrene, acrylonitrile and crosslinking or grafting monomers having more than one polymerizable double bond such as diallyl phthalate, divinylbenzene, butanediol diacrylate or triallyl (iso)cyanurate. The hard constituents are generally derived from styrene, α-methylstyrene and copolymers thereof, preferred comonomers being acrylonitrile, methacrylonitrile and methyl methacrylate.

Preferred core-shell graft rubbers have a soft core and a hard shell or a hard core, a first soft shell and at least one further hard shell. The incorporation of functional groups such as carbonyl, carboxylic acid, acid anhydride, acid amide, acid imide, carboxylic esters, amino, hydroxyl, epoxy, oxazoline, urethane, urea, lactam or halobenzyl groups is here preferably effected by the addition of suitably functionalized monomers during the polymerization of the last shell. Suitable functionalized monomers include for example maleic acid, maleic anhydride, mono- or diesters of maleic acid, tert-butyl (meth)acrylate, acrylic acid, glycidyl (meth)acrylate and vinyloxazoline. The proportion of monomers having functional groups is generally within the range from 0.1 to 25% by weight, preferably within the range from 0.25 to 15% by weight, based on the total weight of the core-shell graft rubber. The weight ratio of soft to hard constituents is generally within the range from 1:9 to 9:1, preferably within the range from 3:7 to 8:2.

Such rubbers, which enhance the toughness of polyamides, are known per se and described in EP-A-0 208 187 for example.

A further group of suitable impact modifiers are thermoplastic polyester elastomers. Polyester elastomers are segmented copolyetheresters containing long-chain segments, generally derived from poly(alkylene) ether glycols, and short-chain segments, derived from low molecular weight diols and dicarboxylic acids. Such products are known per se and are described in the literature, for example in U.S. Pat. No. 3,651,014. Corresponding products are also commercially available under the names of Hytrel® (Du Pont), Arnitel® (Akzo) and Pelprene® (Toyobo Co. Ltd.).

It will be appreciated that it is also possible to use mixtures of different rubbers.

As further additives there may be mentioned for example processing aids, stabilizers and oxidation retardants, agents against thermal decomposition and decomposition by ultraviolet light, lubricating and demolding agents, flame retardants, dyes and pigments and plasticizers. The proportion thereof is generally up to 40%, preferably up to 15%, by weight, based on the total weight of the composition.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$, $Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black ($Cu(Cr, Fe)_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78 ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demolding agents, which are generally included in the thermoplastic material in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The examples which follow illustrate the invention.

EXAMPLES

Catalyst Preparation

Catalyst 1 Beta Zeolite Powder

The catalyst used was a beta zeolite from Uetikon (Zeokat-Beta) having the following composition: $SiO_2$=91%, $Al_2O_3$=7.8%, $Na_2O$=0.5%, $K_2O$=0.7%, BET surface area=700 $m^2/g$, pore size in Å=7.6×6.7; 5.5×5.5, particle size 0.2–0.5 μm.

Catalyst 2 Beta Zeolite Extrudates 220 g of β-zeolite from Example 1 were kneaded with 5% of Walocel® and 230 g of water for 45 minutes. The material was then molded under a pressure of 70 bar into 2 mm extrudates. These were dried at 110° C. and calcined at 500° C. for 16 h.

195 g of these extrudates were exchanged with 3 liters of 20% strength $NH_4Cl$ solution at 80° C. for 2 h and then washed with 10 l of water. Thereafter a second exchange was effected again with 3 l of 20% strength $NH_4Cl$ solution at 80° C./2 h and the product was washed Cl-free. Drying at 110° C. was followed by 5 h of calcination at 500° C.

Catalyst 3 Sheet-silicate Type K10®

K10® is an acid-treated montmorillonite from Süd-Chemie. It has a BET surface area of 180–220 $m^2/g$ and an ion exchange equivalent of 40–50 meq/100 g.

Catalysts 4 and 5 $TiO_2$ Extrudates of 100% and 84% Anatase, Respectively

Preparation is in line with the description in Ertl, Knözinger, Weitkamp: "Handbook of heterogeneous catalysis", VCH Weinheim, 1997; page 98 ff The $TiO_2$ polymorphs described as particularly preferred in the preceding description were mixed with water, silica sol and glycerol, extruded and calcined at 550° C.

Catalyst 6 Titanium Dioxide/tungsten Oxide Catalyst

The catalyst used was obtained by intimately mixing the commercially available titanium dioxide VKR 611 (from Sachtleben) with tungsten oxide and subsequent extrusion as per Example 2 or 4.

It has the following specification: 20% by weight of $WO_3$, 80% by weight of $TiO_2$; BET surface area=73 $m^2/g$, total acidity ($pK_a$=6.8)=0.56 mmol/g; total acidity ($pK_a$=−3)=0.035 mmol/g.

The so-called relative viscosity (RV), a measure of the molecular weight build-up and the degree of polymerization, is measured in 1% strength by weight solution in the case of extracted material and in 1.1% strength by weight solution in the case of unextracted polymer, in 96% strength sulfuric acid, at 25° C. using an Ubbelohde viscometer. Unextracted polymers are dried under reduced pressure for 20 hours prior to analysis.

The amino and carboxyl end group contents (AEG and CEG, respectively) are determined on extracted polycaprolactam by an acidimetric titration. The amino groups are titrated with perchloric acid in 70:30 (parts by weight) phenol/methanol as solvent.

For extraction, 100 parts by weight of polycaprolactam are stirred with 400 parts by weight of demineralized water at 100° C. for 32 hours under reflux and, after removal of the water, dried gently, i.e., without postcondensation, at 100° C. under reduced pressure for 20 hours. The extractables (EXT) content is reported based on the polycaprolactam.

Examples 1, 2, C1, C2

The starting mixture, consisting of aminocapronitrile (purity 99%) and water or extract water with a molar mixing ratio (based on $H_2O$ in extract water) of 1:6, is pumped through a tubular reactor 1000 m in length and 36 mm in internal diameter and optionally packed with $TiO_2$ extrudates (catalyst 4: diameter 4 mm, length 5–10 mm). The extractables content of the extract water used is within the range from 6 to 7% by weight in all tests.

The reaction mixture is then decompressed in a separating vessel (capacity 21) to a pressure within the range from 30 to 60 bar. A gear pump transfers the reaction mixture from the second process step into a further tubular reactor (length 1000 m; internal diameter 36 mm) of the third process step, which contains Raschig rings (6 mm in length and 6 mm in diameter) as packing. The reaction mixture has water or extract water added to it continuously at the entry to step 3 at a flow rate of 0, 50 or 100 ml/h. The reaction mixture from the third step is then transferred into a fourth step for postcondensation.

The process parameters corresponding to the illustrative tests are listed in Table 1. The tabled examples show that the use of extract water in the starting mixture and in the third step does not affect the viscosity of the polycaprolactam, represented in Table 2, and does not impair product properties.

TABLE 1

Process parameters of Examples 1, 2, C1, C2

| Examples | ACN:H$_2$O ACN:EW[1] | Step 1 P [bar] | Cat.[2] | T [° C.] | Step[7] 2 P [bar] | T [° C.] | Step 3 H$_2$O, EW[3] | P [bar] | T [° C.] | Step[7] 4 P [bar] | T [° C.] | DS[6] [g/h] |
|---|---|---|---|---|---|---|---|---|---|---|---|---|
| C1  | ACN[4]:H$_2$O = 1:2 | 90 | − | 261 | 30 | 253 | 10% H$_2$O | 33 | 261 | 1.2 | 250 | 300 |
| 1   | ACN[4]:H$_2$O = 1:2 | 90 | − | 261 | 30 | 253 | 10% EW   | 33 | 261 | 1.2 | 250 | 300 |
| C2  | ACN[5]:H$_2$O = 1:6 | 55 | + | 250 | 30 | 250 | 18% H$_2$O | 40 | 240 | 1.5 | 253 | 600 |
| 2.1 | ACN[5]:EW = 1:6     | 55 | + | 250 | 30 | 250 | 18% H$_2$O | 40 | 240 | 1.5 | 253 | 600 |
| 2.2 | ACN[5]:EW = 1:6     | 55 | + | 250 | 30 | 250 | 8% EW    | 40 | 240 | 1.5 | 253 | 600 |
| 2.3 | ACN[5]:EW = 1:6     | 55 | + | 250 | 30 | 250 | 17% EW   | 40 | 240 | 1.5 | 253 | 600 |

[1]EW = extract water; the ratio shown is the molar ratio of ACN to extract water.
[2][+]: catalyst: TiO$_2$ pellets. [−]: catalyst-free process step.
[3]Refers to the amount of water additionally added in the third step, based on the mass flow through the first step.
[4]Purity of ACN charge used: <99.5%
[5]Purity of ACN charge used: <99.0%
[6]DS: mass flow in g/h through the first step
[7]The fill level in the separators of steps 2 and 4 was 50% in all runs

TABLE 2

Product properties of polycaprolactam

| Examples | Extract water used | RV | CEG | AEG | EXT[6] [%] |
|---|---|---|---|---|---|
| C1  | —                          | 2.21 | 66 | 54 | 10.23 |
| 1   | Step 3                     | 2.22 | 59 | 51 | 10.10 |
| C2  | —                          | 1.79 | 95 | 77 | 10.50 |
| 2.1 | ACN/EW starting feed       | 1.81 | 93 | 76 | 10.53 |
| 3.3 | ACN/EW starting feed & step 3 | 1.80 | 80 | 91 | 10.83 |
| 2.3 | ACN/EW starting feed & step 3 | 1.81 | 85 | 87 | 10.60 |

[6]EXT: extractables content in % by weight

I claim:

1. A process for producing polyamides by reacting at least one aminonitrile with aqueous monomer and oligomer extracts obtained from polyamide production by extraction of the polymer with water.

2. A process for producing a polyamide by reaction of at least one aminonitrile with water, which comprises:
   (1) reacting at least one aminonitrile with an aqueous medium at a temperature from 90 to 400° C. and a pressure from 0.1 to 35×10$^6$ Pa to obtain a reaction mixture,
   (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and separating the first gas phase from the first liquid or the first solid phase or from the mixture of first liquid and first solid phase, and
   (3) admixing the first liquid or the first solid phase or the mixture of first liquid and first solid phase with a gaseous or liquid phase comprising an aqueous medium at a temperature from 90 to 370° C. and a pressure from 0.1 to 30×10$^6$ Pa to obtain a product mixture, the aqueous medium used in step 1 and/or 3 being aqueous monomer and oligomer extracts obtained from polyamide production by extraction of the polymer with water, and otherwise water.

3. A process as claimed in claim 2, comprising, additionally or instead of step 3, the following step:
   (4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

4. A process as claimed claim 2, wherein metal oxide catalysts are used in the form of a fixed bed in step 1 or in step 3 or in both step 1 and step 3.

5. A process as claimed in claim 3, wherein titanium dioxide is used as catalyst.

6. A process as claimed in claim 2, wherein, in step 3, the gaseous or liquid phase comprising the aqueous medium is added in an amount from 50 to 1500 ml of water per 1 kg of first liquid or first solid phase or mixture of first liquid and first solid phase.

7. A process as claimed in claim 2, wherein steps 1 to 3, 1, 2 and 4 or 1 to 4 are carried out continuously.

8. A process as claimed in claim 2, wherein at least one of the gas phases obtained in the respective stages is recycled into at least one of the preceding steps.

9. A process as claimed in claim 2, wherein the aminonitrile used is an ω-aminoalkyl nitrile having an alkylene moiety (—CH$_2$—) of from 4 to 12 carbon atoms or an aminoalkylaryl nitrile having 8 to 13 carbon atoms.

10. A process as claimed in claim 2, wherein the following mixture is used:

| from 50 to 99.99% by weight of | 6-aminocapronitrile, |
|---|---|
| from 0.01 to 50% by weight | of at least one dicarboxylic acid selected from the group consisting of aliphatic C$_4$–C$_{10}$-α,ω-dicarboxylic acids, aromatic C$_8$–C$_{12}$-dicarboxylic acids and C$_5$–C$_8$-cycloalkanedicarboxylic acids, |
| from 0 to 50% by weight | of an α,ω-diamine having 4–10 carbon atoms, |
| from 0 to 50% by weight | of an α,ω-C$_2$–C$_{12}$-dinitrile, and |
| from 0 to 50% by weight | of an α,ω-C$_5$–C$_{12}$-amino acid or of the corresponding lactam, |
| from 0 to 10% by weight | of at least one inorganic acid or salt thereof, | the individual weight percentages adding up to 100%.

* * * * *